July 23, 1940.　　J. A. H. BARKEIJ　　2,209,014
CONNECTING ROD STRUCTURE
Filed Feb. 28, 1938　　6 Sheets-Sheet 3

INVENTOR.
J.A.H.Barkeij

July 23, 1940.    J. A. H. BARKEIJ    2,209,014
CONNECTING ROD STRUCTURE
Filed Feb. 28, 1938    6 Sheets-Sheet 4

INVENTOR.
J. A. H. Barkeij

July 23, 1940.  J. A. H. BARKEIJ  2,209,014
CONNECTING ROD STRUCTURE
Filed Feb. 28, 1938  6 Sheets-Sheet 5

INVENTOR.
J.A.H.Barkeij

July 23, 1940.  J. A. H. BARKEIJ  2,209,014
CONNECTING ROD STRUCTURE
Filed Feb. 28, 1938   6 Sheets-Sheet 6

INVENTOR.
J.A.H.Barkeij

Patented July 23, 1940

2,209,014

UNITED STATES PATENT OFFICE 2,209,014

CONNECTING ROD STRUCTURE

Jean A. H. Barkeij, Altadena, Calif.

Application February 28, 1938, Serial No. 193,005

13 Claims. (Cl. 74—580)

My invention relates more particularly to connecting rod structures of the radial type or rotary type.

The standard radial or rotary type of internal combustion engines has a so-called master connecting rod on a crankpin, and to said master rod are articulated by means of so-called knuckle pins the other connecting rods of the other cylinders.

The main object is to do away with the master rod and to avoid the great load which this master rod exerts all the time on the piston and cylinder wall associated with said master rod.

Other objects will appear during the description of the structure.

Fig. 1 shows Fig. 2 on the section line 1—1.

Figure 4:
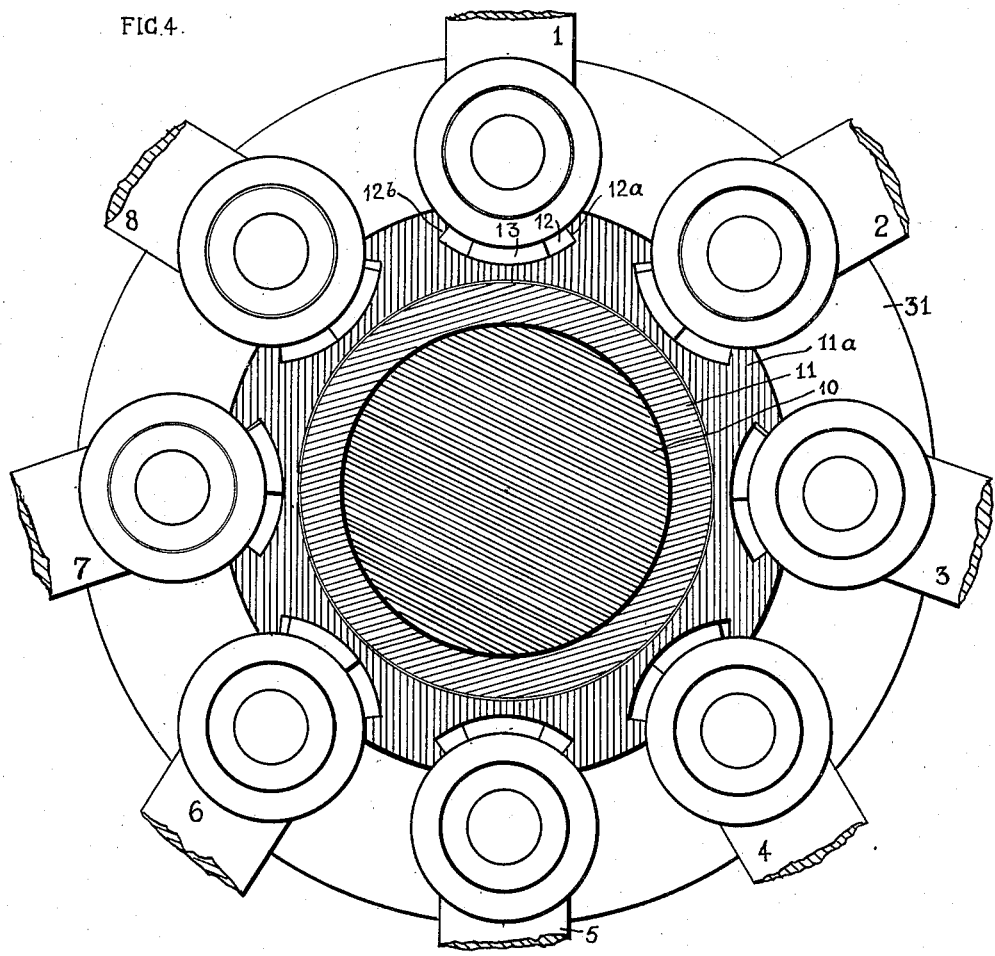

Fig. 4 shows a vertical cross-section of a crankpin of a radial engine of the two stroke type having eight cylinders radially arranged the crankshaft, and a ring thereon carrying the knuckle pins of the connecting rods of the engine, and an annular element 11a rotatably arranged on said crankpin, provided with shoulders or abutments to limit the pivoting motion of the connecting rods arranged on said knuckle pins. Fig. 4 is an enlarged vertical section of the central part of Fig. 5.

Figure 5:
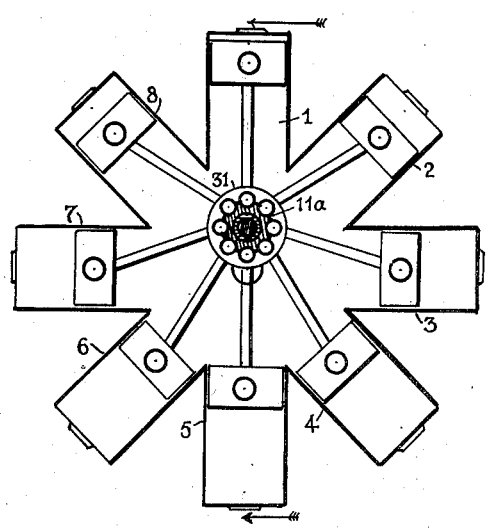

Fig. 5 shows a diagrammatic representation of the arrangement of the connecting rod structure of Fig. 4 as applied on a radial 8 cylinder two stroke engine, having its cylinders arranged at intervals of 45°.

Figure 6:
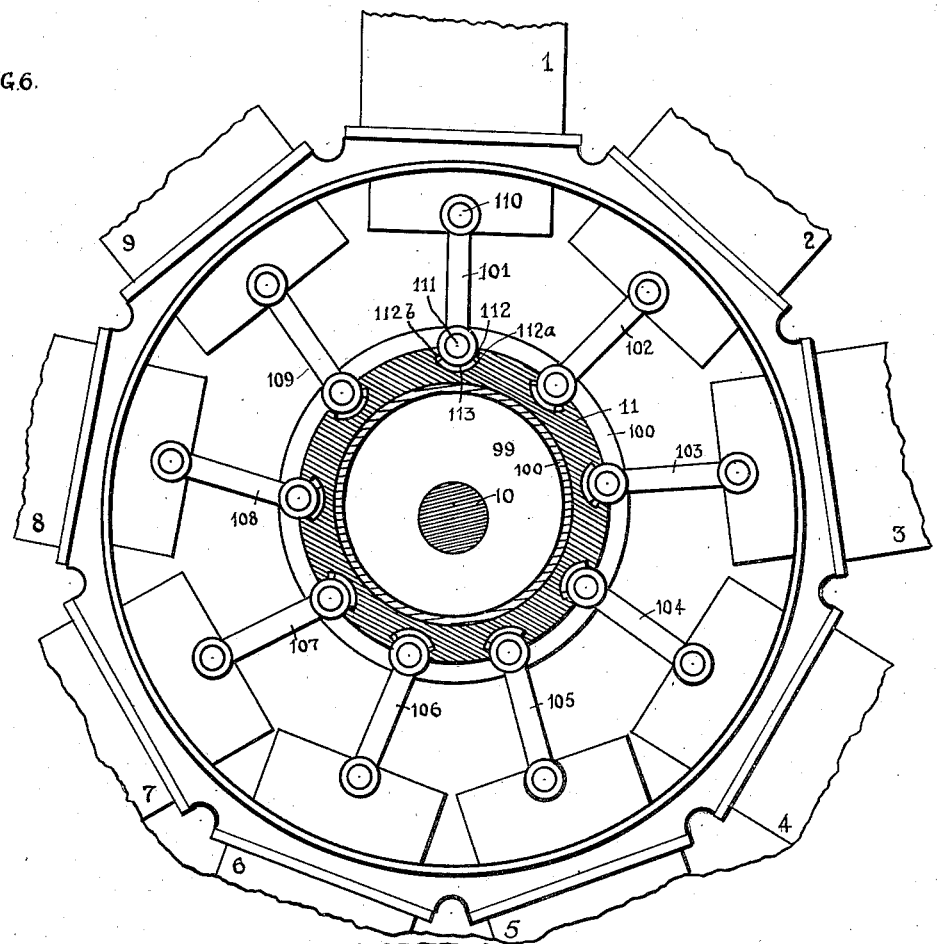

Fig. 6 shows a vertical cross section of driven sleeve-valve-gear for a radial nine cylinder two-stroke-cycle engine, and an eccentric on the crankshaft (or an eccentric on a shaft geared to the crankshaft) driving a strap or annular ring 100 thereon, which carries an element 11 to control the angularity of the connecting rods attached to the sleeve-valves, reciprocating in said cylinders with the same cycle as the pistons therein. Likewise here the element 11 may form a unit with the eccentric strap or may float thereon, as shown in Fig. 4.

Figure 7:
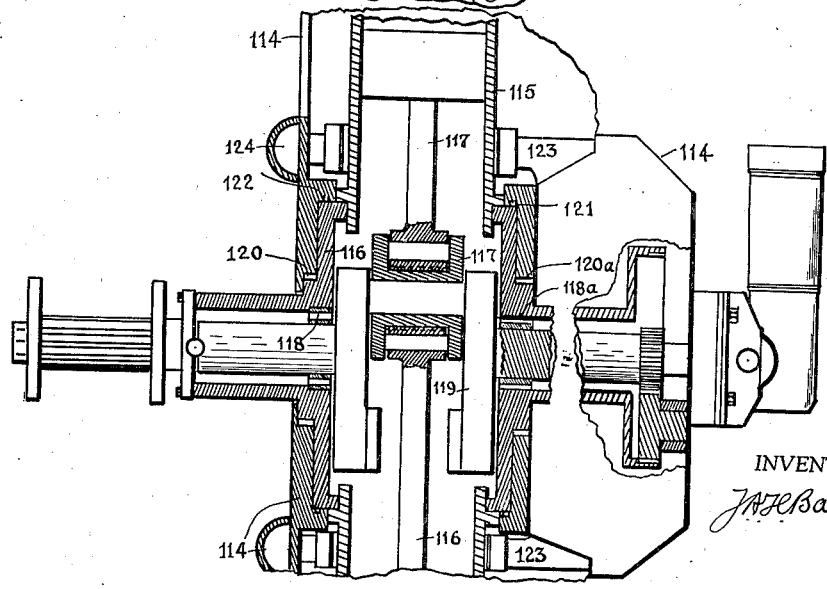

Fig. 7 shows a vertical cross section of a rotary engine, in which the crankshaft is stationary and the cylinders and crankcase rotate, and combined with my new connecting-rod structure (or crankshaft and cylinders may rotate, as shown to the right in same figure).

Figure 2:
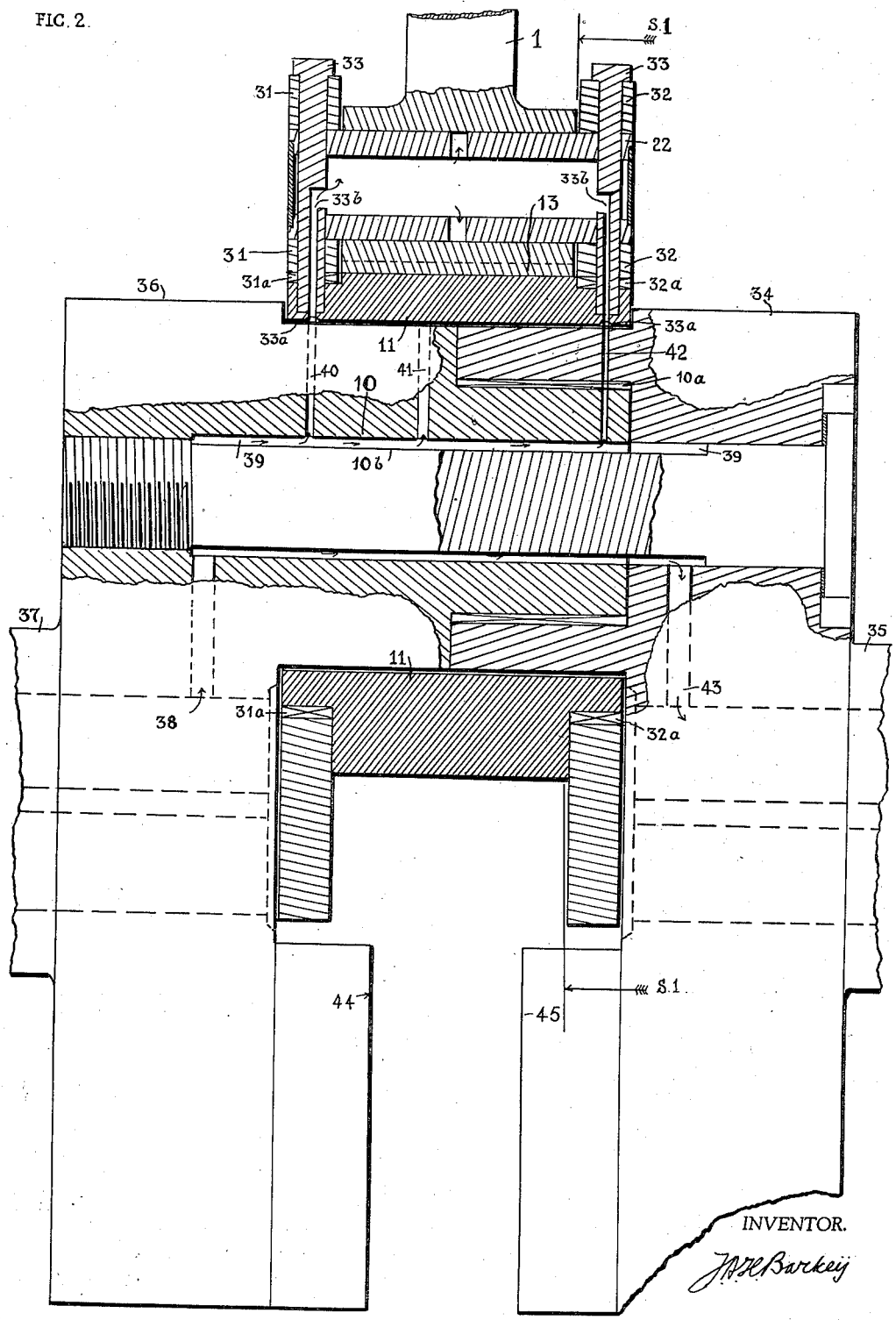
Fig. 2 shows a vertical cross-section lengthwise the crankpin and connecting rod structure of Fig. 1 on the section line 2—2.
Figure 3:
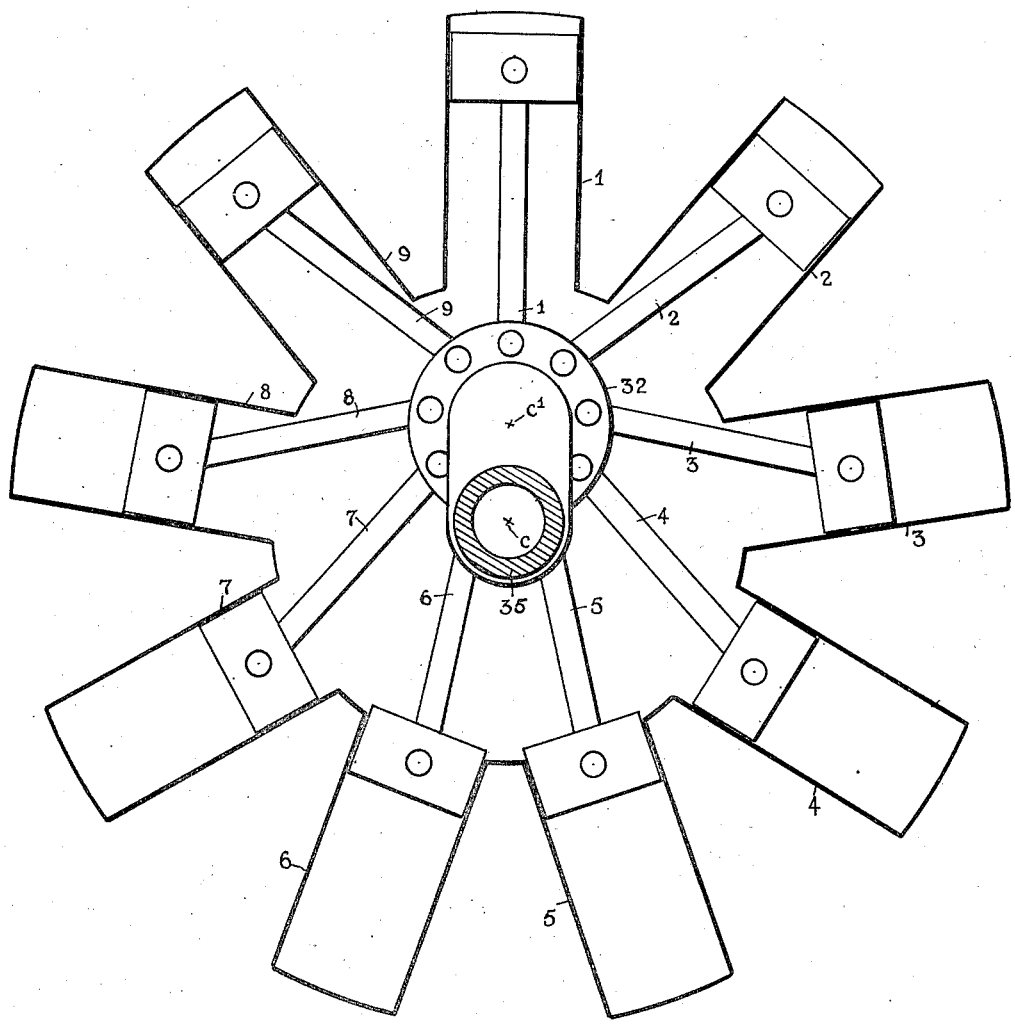
Fig. 3 shows a diagrammatic representation of the cylinders in relation to the connecting-rod-structure of Figs. 1 and 2.
Figure 8:
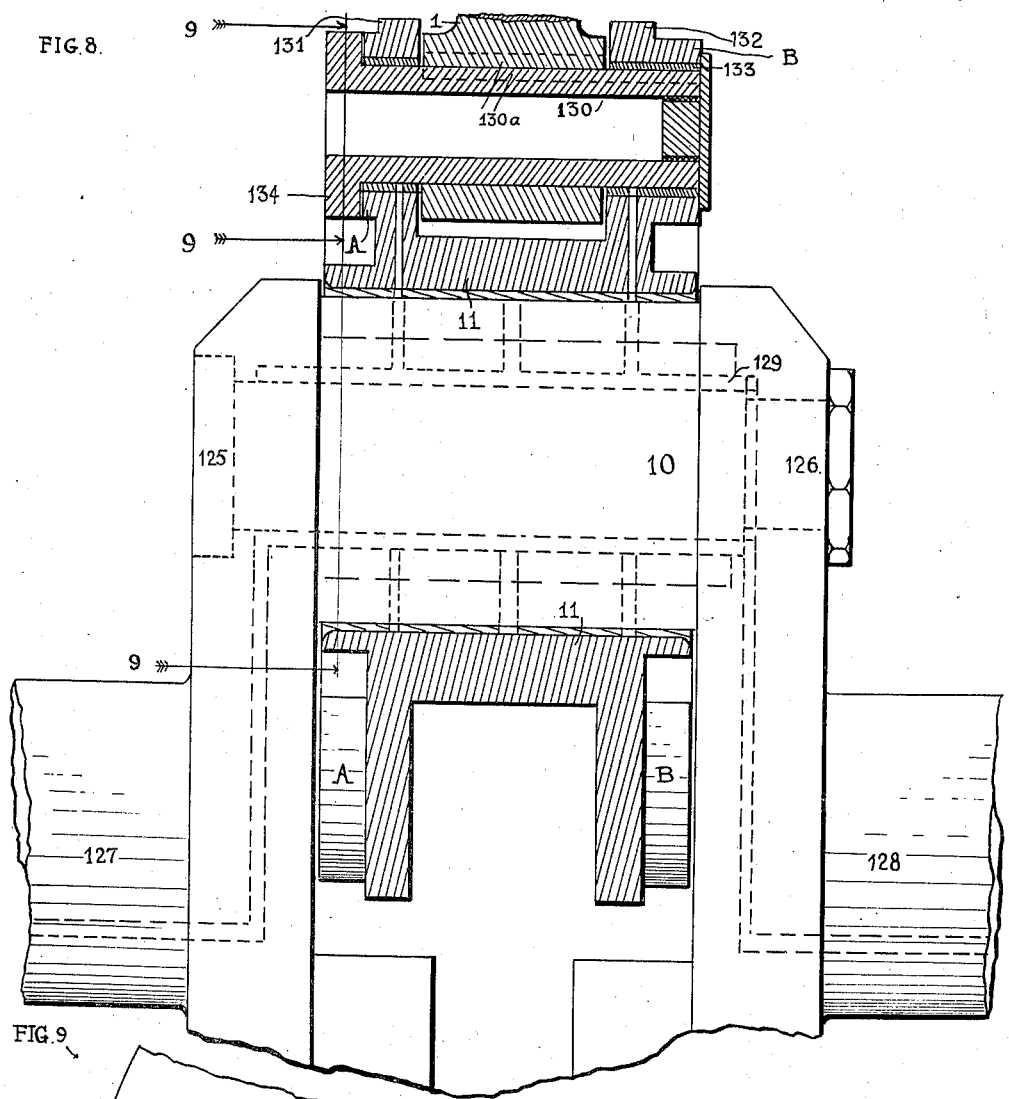

Fig. 8 shows a connecting rod structure similar to that shown in Fig. 2, with this difference that the knuckle pin at the foot of the connecting rod pivots in the annular ring rotatably arranged on the crankpin, and the foot of the connecting rod has again a shoulder or abutment cooperating with the shoulders or abutments on the annular ring on the crankpin to limit the pivoting movement of the connecting rods.

Figure 9:
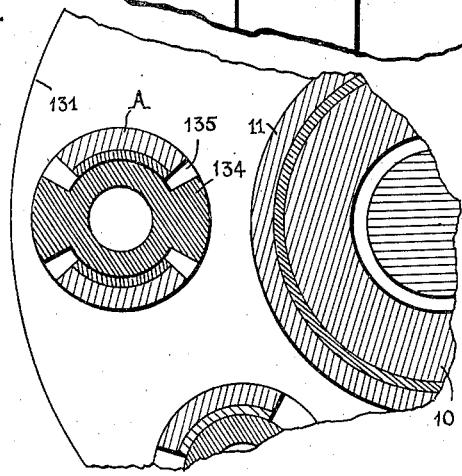

Fig. 9 shows in vertical cross section (on the section line 9—9 of Fig. 8) how to limit the rocking motion of the connecting rod with respect to the annular ring 11 when the rods are pivoted in the ring.

Figure 1:
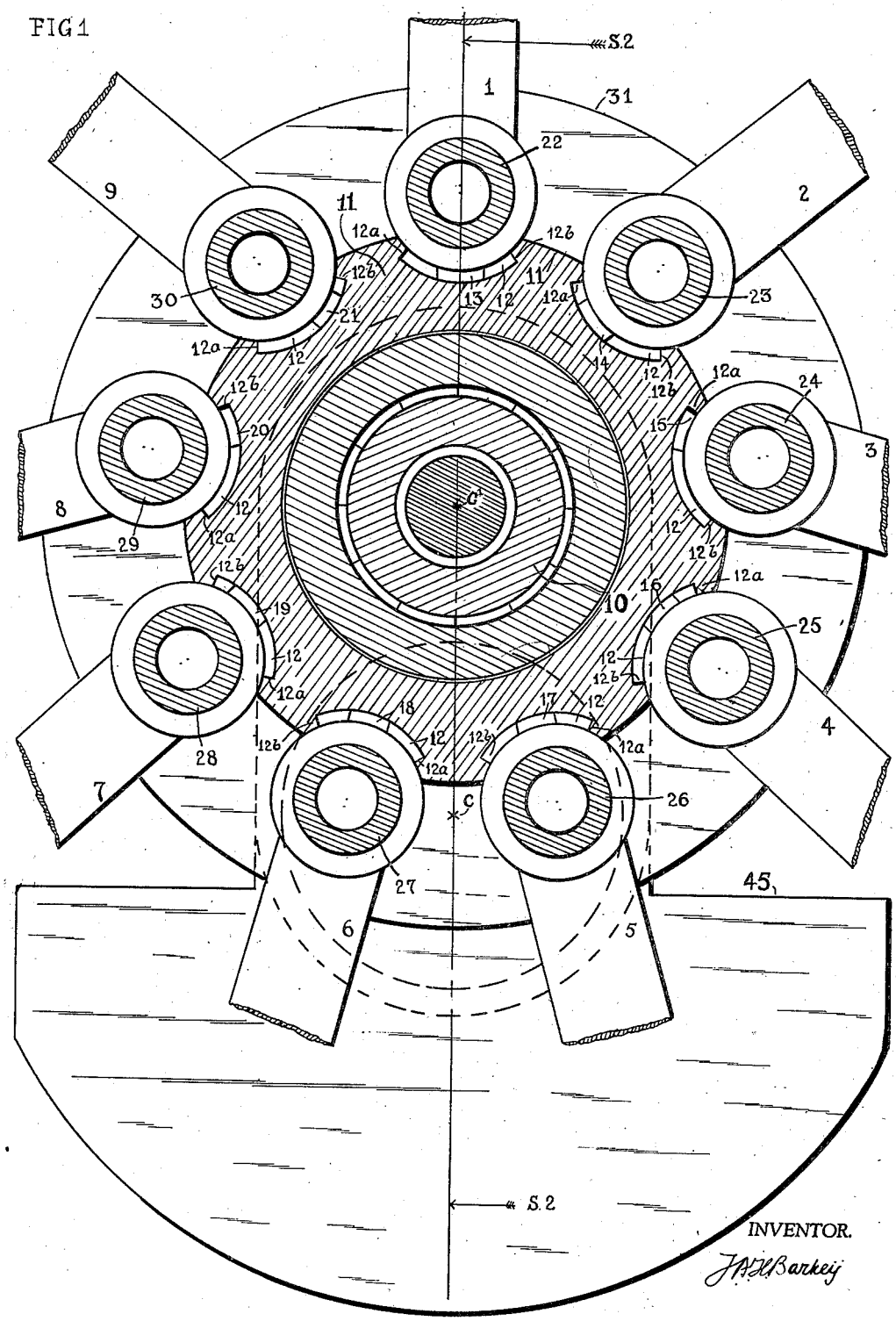
Fig. 1 shows a vertical cross section transverse of a crankpin of a radial engine, and a ring mounted thereon carrying the knuckle pins of the connecting rods of the radial engine, in this particular case a nine-cylinder radial engine.

Referring more particularly to Fig. 1, the numbers 1 to 9 indicate the nine connecting rods reciprocating the nine pistons in a nine cylinder radial engine. 10 indicates the crankpin, and 11 indicates a ring around said crankpin provided with nine grooves 12 parallel to the axis of said crankpin and said ring. In said grooves swing the shoulders 13 to 21 of the connecting rods 1 to 9, which connecting rods rotate or swing around nine knuckle pins 22 to 30 attached to a ring 31 which forms a unit with the said ring 11. As shown in Fig. 2 the crankshaft has two crankarms 34 and 36 each having a journal pin respectively 35 and 37. In the journal pin 37 is an oil-conduit 38 leading oil under pressure to a conduit 39 between a central pin 10b, and the crankpin 10 proper. From this oil conduit a plurality of oil conduits 40–42 lead to the bearing surface between the crankpin 10 and the ring 11, two of which lead to a circumferential, internal, groove 33a in the bearing surface of the ring 11. With this latter groove 33a communicate two oil-passages 33b in two pins 33, which extend through the ends of each knuckle pin 22 to 30. Each pin serves further to connect the rings 31 and 32 on opposite sides of the internal ring 11, having the grooves 12, in which swing the shoulders 13 of the connecting rods 1 to 9. These two rings 31, 32 may be splined on the internal ring 11, and the pins 33 fasten these three parts together providing thereby a basis for the knuckle pins 22 to 30, so that the connecting rods can swing on said pins 22 to 30. The knuckle pins 22 receive internally the oil from the oil passages 33b in the pins 33 and from there the oil is led to the bearing surface between connecting rod and knuckle pin. Each knuckle pin is hollow but closed at the ends, of course.

When the engine, that means when the crankshaft rotates and the cylinders are stationary, or the crankshaft is stationary and the cylinders rotate, or the crankshaft and cylinders both rotate, the piston and connecting rods cannot rotate the entire assembly on the crankpin 10. Each connecting rod having a shoulder 13 swinging in the groove 12 of the ring 11, has only a limited swing movement, which is only enough to allow the connecting rod to assume a maximum angularity, approximately equal to that which it assumes when the crankpin assumes a ninety degree position past or before top dead center position of any particular cylinder. Therefore when the connecting rod 1 is in top dead center position for cylinder 1 (the cylinders are as in standard practice arranged in radial directions at 40° interval from a point C, which is the center of the crankpin journal 37) the connecting rods 8 and 3 are at an angle of about 80° with respect to the cylinders 8 and 3 respectively. Therefore if the gas pressure in cylinder 1, when the piston is approaching or receding from top dead center, tends to rotate the rings 11, 31, 32, forming a unit, it will be only able to rotate them a very small amount because a rotation of the unit 11, 31, 32 of about 5° to 10° with respect to the center $C^1$ of the crankpin 10, causes a great variation in the angularity of the connectings rods 8 and 3 with respect to the axes of said cylinders 8 and 3, which radiate from the point C which is the axis of the crankpin-journal 37. The result of such a rotation by connecting rod 1 of rings 11, 31, 32 on crankpin 10 in counterclockwise direction will force the shoulder 15 of connecting rod 3 against the shoulder 12a on the ring 11, and the angularity of the connecting rod 3 cannot be increased, which stops the rotation of the ring 11. If the gas pressure or inertia of the piston 1 tends to rotate the unit 10, 31, 32 clockwise, on crankpin 10 the shoulder 20 of connecting rod 8 will be forced against the shoulder 12b on the ring 11. Therefore the inertia or the gas pressure of any connecting rod or cylinder is not able to rotate the unit 10, 31, 32 very much, because the shoulders at the lower end of two connecting rods will always prevent a great rotation of this unit on the crankpin 10. After piston 1 recedes from top dead center, the piston in cylinder 2 approaches dead center and equally here the shoulders on the connecting rods 9 and 4 will prevent any appreciable rotation in either direction of the said unit on crankpin 10 for the same reason as explained. After piston 2, piston 3 approaches compression and firing position and the shoulders on connecting rods 1 and 5 cooperate with the corresponding shoulders 12b and 12a on the ring 11 to prevent appreciable rotation of the unit 11, 31, 32. Therefore likewise and successively the shoulders on connecting rods 2 and 6, 3 and 7, 4 and 8, 5 and 9, 6 and 1, 7 and 2 do the same job until the shoulders of connecting rods 8 and 3 come again into play.

The aforesaid construction can be applied on any radial engine having three or more cylinders arranged radially with respect to the crankshaft. In either one of said types the actual rotation of the unit 11, 31, 32 can be limited so much that the connecting rods of the various cylinders cannot touch the lower ends of the cylinders because said shoulders 13 determine the maximum angularity of the rods. Various minor modifications can be conceived, as for instance a construction whereby the ring 11 is free to rotate with respect to the rings 31, 32, which can be connected under such a ring 11 so that they form a unit and a basis for the knuckle pins 22 to 30, but all such modifications fall under the scope of the following claims.

The engine may have further, for instance, an even number of cylinders, for instance, if a two stroke cycle engine is used. Or the knuckle pins can be made rotatable on the rings 31, 32, and the connecting rods solidly fastened on said pins so that they cannot rotate thereon, and in that case, of course, the swiveling motion of the knuckle pins has to be limited to get the same effect. If the ring 11 is freely rotatable with respect to the rings 31 and 32, rotation of the rings 31, 32 with the connecting rods thereon effects a rotation of the ring 11 because the shoulders 12a and 12b on the ring 11 will be shifted from one shoulder 13 of one connecting rod to the shoulder 13 of a connecting rod at 160° removed therefrom, so that the angularity of each connecting rod can be only increased a limited extent and only so far as another shoulder on the ring 11 allows a connecting rod, 160° removed therefrom, (in a nine cylinder radial engine), to assume a certain angularity and not more.

It is further understood that I may apply the same mechanism on a driven eccentric shaft, to which are also pivoted connecting rods driving sleeves for instance in a radial type of engine. An eccentric motion given to a unit 11, 31, 32 as shown, will limit thereby the angularity of the rods connected thereto in the same way and such a unit 11, 31, 32 is in the same way prevented from changing its rotative position appreciably on an eccentric part of a rotating driving shaft. In the present arrangement the parts attached to the rods and unit 11, 31, 32 drive the shaft, but reversely the shaft or eccentric part 10 may be driven, which motion reversely reciprocates the parts attached to the rods. Essentially they are the same constructions.

These modifications are shown in the Figures 4 to 9. Referring more particularly to Figs. 4 and 5, we see that this assembly for an 8 cylinder two stroke radial engine is very much the same as the structure shown in Fig. 1, with this difference that the element 11a with the grooves 12 and abutments 12a and 12b, is rotatably arranged on the annular ring 11 carrying the knuckle pins for the various connecting rods. The angularity of each connecting rod may rotate slightly the ring 11a on the annular ring 11 on the crankpin 10, so that the connecting rods all together in cooperation control the exact radial position of said ring 11a on the ring 11 carrying the knuckle pins for the connecting rods reciprocating the cylinders.

The next modification of the radial engine with an even number of cylinders is shown simultaneously therewith. The exhaust valves are arranged in the top of the cylinders and the inlet ports in the cylinders are controlled by the pistons. A blower provides the charging force. This arrangement is well known in the art and the particular details thereof are, of course, omitted. Fig. 4 shows the central part of Fig. 5 only, the connecting rod structure.

The next modification in which the knuckle pins may pivot in the rings 131 and 132 is shown in Fig. 8. The two rings 131 and 132 are provided with hollow bosses A and B, extending outwardly from said rings to provide a liberal bearing surface for the foot 130 of the connecting rods to pivot therein. Oil leads from the crankshaft lead to all these pitman joints and to the bearing of the annular ring, carrying the annular rings 131 and 132 by means of splines. Or as shown the connecting rod may be keyed to the knuckle pin, 130 and 130a.

The next modification is shown in Fig. 6, in which I provide the old crankshaft 10 with an eccentric 99, rotating in an eccentric strap 100 to which are attached for instance nine connecting rods for the sleeves of a radial nine cylinder two stroke. I may provide these cylinders with sleeves controlling an exhaust port at the top end of the cylinder end an inlet port at the lower end of the cylinder. Again a supercharger feeds in a manner also well known air or a fuel-air-mixture to the cylinders and all these parts are omitted as irrelevant.

The eccentric strap 100 is again provided with said element 11 of Fig. 1, or 11a of Fig. 4, provided with grooves 112, in which swing the shoulders or abutments 113 of the connecting rods 101 to 109, to limit in cooperation with the shoulders or abutments 112a and 112b of the ring 11, the angularity of the connecting rods driving the sleeve valves. On each sleeve valve is a pin 110, and on the eccentric strap 100 are nine pins 111, to provide a connection between eccentric strap 100 and the nine sleeves. Cylinder 1 is shown in firing positions and cylinders 5 and 6 are going through the scavenging and charging period.

Upon rotation of the crankshaft 10 and eccentric 99, the eccentric strap receives an oscillating movement but is prevented from rotating by the abutments, 112a and b, on the ring 11 and the abutments 113 on the connecting rods, very much in the same way as shown for the crankshaft construction of Figs. 1 and 4 driving pistons in cylinders instead of being driven.

Likewise here the element 11 may form a unit with the strap 100 or may freely rotate thereon.

Finally in Fig. 7 I show the last modification, in which the crankshaft is stationary and the cylinders rotate, the so-called rotary type of engine (a variation thereof whereby the cylinders and crankshaft both rotate is an intermediate type, and may, of course, use the same construction of the connecting rods. The gearing therefore is shown diagrammatically in the same figure to the right).

The cylinders 115, in Fig. 7, are arranged on a crankcase 116 rotatably arranged on a crankshaft 119, carrying on its crankpin the connecting-rod-structure of either Fig. 1 or 4. Roller bearings 118 and 118a reducing the friction between the two. This entire unit, cylinders 115 and crankcase 116 rotate inside a stationary structure indicated by 114, which carries the blower, starter, magnetos, etc. The exhaust and inlet ports are at the lower end of the cylinders and are respectively part of the time in communication with an annular exhaust manifold and annular inlet manifold 124 and 123, respectively. The stationary unit 114 is separated from the rotating unit 115 by the friction roller bearings 120 and 120a and reduce the friction between the two. The propeller is preferably fixed to the rotating unit 115, the cylinders, and crankcase 116. In connection therewith it may be stated that the crankshaft unit 117, 119 may be geared to the unit of the cylinders 115 in any ratio, so that the speed of the propeller shaft may be chosen in the proper relation to the rotative speed of the cylinder unit. This gearing is omitted as being well known in the prior art and further irrelevant to the scope of the annexed claims. (See for instance, Patent 1,084,192 of Jan. 13, 1914, to E. Becker and F. Dinslage.)

Finally Fig. 9 shows in connection with Fig. 8, a modification how to limit the rocking motion of the connecting rod with respect to the annular ring on the crankpin. The knuckle pin may be provided with a shoulder 134, which swings in an indention 135 of the boss A carrying the knuckle pin in the ring 131. It is, of course, understood that this construction is not imperative, but that the connecting rod may be provided at its lowest end again with an abutment 13, swinging in an arcuate groove in the ring 11 as shown in Figs. 1 and 4, which is altogether the same construction as that shown in Fig. 9, a lever of the first order having its fulcrum between unequal arm levers.

Any modification or adaptation of any feature of the present invention is included in the scope of this invention.

It is further understood that a combination of the constructions of Figs. 1 and 4 is possible, in thes ense that the construction of Fig. 4 may be applied on a ring on the outside of the ring, carrying the knuckle pins. The knuckle pins may be provided with shoulders 13, swinging in arcuate grooves in such a loose ring as shown in Fig. 4 but arranged on the outside, and the connecting rods may carry shoulders 13, swinging in arcuate grooves in the ring carrying the knuckle pins. The meaning of Fig. 4 is not that the loose ring necessarily has to be arranged under the knuckle pins and on the ring carrying said knuckle pins. Said loose ring may be arranged, of course, beside the ring carrying the knuckle pins and the knuckle pins have to be provided with abutments or shoulders on the outside as shown in Fig. 9.

I claim:

1. A crankshaft and a crankpin thereon, a ring rotatably fixed on said crankpin, a pivot and connecting rod connected to said ring and means associated with said ring and the lower end of the connecting rod beyond said pivot to limit the swinging movement of said rod on said ring.

2. A crankshaft, a crankpin thereon, a rotatable member on said crankpin, a knuckle pin on said member and means cooperative between said member and the lower end of a rod pivoted on said knuckle pin and beyond said pin to limit the pivoting movement of said rod on said knuckle pin.

3. A crankshaft, a crankpin thereon, a rotatable member on said crankpin, a pivot on said member and a member pivoted on said pivot, and means associated with said two members and located between the pivot and said first member to limit the pivoting motion of said second member on said first member, said means consisting of a third member rotatably arranged on said first rotatable member.

4. In a radial engine, a crankshaft, having a crankpin, a ring rotatably fixed on said crankpin, a plurality of knuckle pins on said ring, connecting rods pivoted on said pins and means operating between the lower ends of said connecting rods below the pivots of said rods and said ring to limit the angularity of said connecting rods on said pins and ring, thereby limiting the rotatability of said ring on said crankpin during the rotation of said engine.

5. A crankshaft and a crankpin thereon, a member rotatably fixed on said crankpin, a plurality of pivots on said member and connecting rods associated with said member and pivots, and means associated with the lowest tip of said rods, and a second member rotatably fixed on said first member on said crankpin, carrying the knuckle pins, to limit the rotation of said first member on said crankpin with relation to at least three radially arranged cylinders, said second member cooperating with said connecting rods through said first member.

6. In a radial engine having at least three cylinders arranged in radial form with an interval of 360° divided by the number of cylinders, a crankshaft, a crankpin thereon, a rotatable member on said crankpin, a plurality of connecting rods pivoted in said member reciprocating the pistons in said cylinders, means associated with the foot of said connecting rods beyond said knuckle pins and said member to limit the angularity of said rods on said member and to thereby limit the rotation of said member on said crankpin.

7. In a radial engine having at least three cylinders arranged in radial form with equal intervals, a crankshaft, a crankpin thereon, a rotatable member on said crankpin, a knuckle pin thereon, a connecting rod pivoted on said pin, a shoulder at the lower end of said connecting rod swinging in a groove of said member, and a shoulder at the end of each groove to cooperate with said shoulder on the connecting rod to limit the swinging motion of the rod relative to said member.

8. A shaft and an eccentric part on said shaft, a member arranged on said eccentric part, connecting rods pivoted on said member, a second element rotatably fixed on said member, shoulders on the lower end of said connecting rods swinging in arcuate shaped grooves in said second element, said grooves being limited at the ends thereof by shoulders so that said shoulders on said rods touch the shoulders of said grooves, limiting thereby the angularity of said rods relative to said shaft.

9. A cylinder, a piston reciprocating therein, a connecting rod attached to said piston, the rod being pivoted to a ring rotatably fixed on an eccentric shaft, a shoulder on said pivot, forming a fixed part of said rod, cooperating with a shoulder on said ring to limit the angularity of said rod with respect to said ring.

10. The combination of claim 1, in which said pivot is composed of a pin on said ring, said connecting rod swinging on said pin, said ring composed of three parts, a center basic part having abutments cooperating with abutments on said rod to limit the angularity of said rods relative to said basic part, and two outer rings splined on said basic part, said pins fastened to said outer rings by means of bolts extending thereto, said same bolts fastening said outer rings on said center basic part.

11. In a radial engine, a connecting rod structure on a crankpin, said structure composed of a plurality of connecting rods on two rings fixed around a basic center part at the outer ends thereof, said basic part having a bearing on said crankpin, and having arcuate grooves limited by shoulders, cooperating with shoulders on said connecting rods to limit the angularity of said rods with respect to said basic part and said crankpin.

12. In a mechanical movement for converting rectilinear to rotary motion, a crankshaft and a crank thereon, a plate or ring to rotate on said crank provided with pivots for connecting rods attached to said ring and to elements having a rectilinear motion, another ring rotatably fixed on said first ring, said second ring carrying abutments cooperating with abutments on said rods, to limit the angularity of said rods relative to said first ring and said crank.

13. In a radial engine, a connecting rod structure on a crankpin of a crankshaft therein, comprising a plurality of connecting rods pivoted to knuckle pins or pivots on a ring rotatably fixed on said crankpin, another ring rotatably fixed relative to said first ring on said crankpin, means associated with said connecting rods and second ring to limit the angularity of said rods relative to said first ring, pins to fix said pivots to said first ring, oil passages in said pins communicating with an oil passage in said crankpin to lead oil from said crankpin through said pins inside said pivots, said pivots having a radial hole to lead the oil to the bearing between said pivots and said rods.

J. A. H. BARKEIJ.